Aug. 3, 1965     J. E. FINK     3,198,458
METHOD OF PACKING AND DEPLOYING A FOLDABLE WING
Filed May 6, 1963     2 Sheets-Sheet 1

INVENTOR.
JAMES E. FINK
BY
Knox & Knox

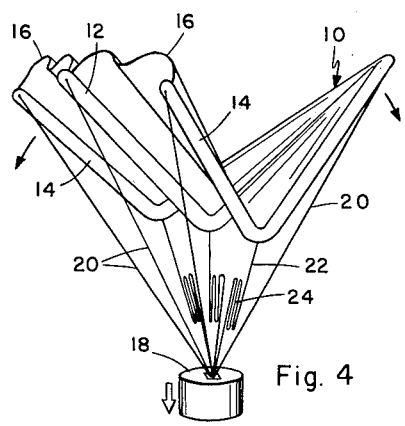
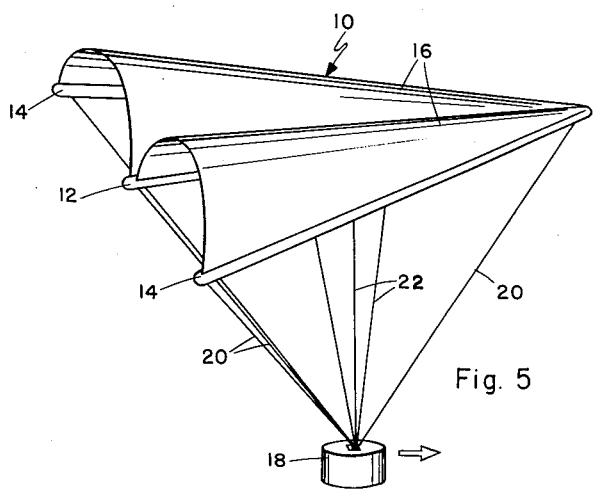
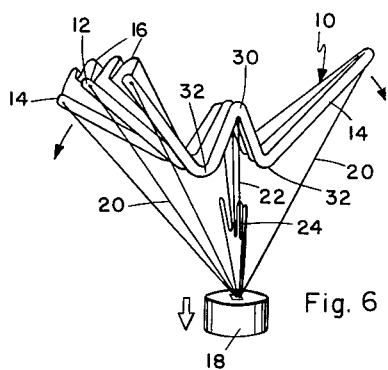

United States Patent Office 3,198,458
Patented Aug. 3, 1965

3,198,458
METHOD OF PACKING AND DEPLOYING
A FOLDABLE WING
James E. Fink, San Diego, Calif., assignor to The Ryan
Aeronautical Co., San Diego, Calif.
Filed May 6, 1963, Ser. No. 278,219
3 Claims. (Cl. 244—49)

The present invention relates generally to aircraft and more specifically a deployment of a parawing, or Rogallo type wing.

The primary object of this invention is to provide a method for deploying a folded Rogallo type wing or parawing into fully open position without danger of entangling the supporting suspension lines, the unfolding action taking place in the general direction of travel of the wing and its payload.

Another object of this invention is to provide a parawing wing deployment method wherein the wing is folded with all of the suspension lines on the outside and the main fold disposed downwardly during the initial opening.

A further object of this invention is to provide a parawing deployment method wherein the folded arrangement of the wing is such that the airloads acting on the wing during initial deployment tend to open the wing fully and effectively with a minimum of shock or strain.

With these objects in view the invention consists in the novel elements, as hereinafter described in the specification, pointed out in the claims and illustrated in the drawings, which form a material part of the disclosure and in which:

FIGURE 4 shows the opening action of the wing;

FIGURE 5 shows the fully opened and gliding configuration of the wing; and

FIGURE 6 is similar to FIGURE 4, but showing an alternative folding arrangement.

Similar characters of reference indicate similar or identical elements and portions throughout the specification and throughout the view of the drawing.

WING CONSTRUCTION

Figure 1:
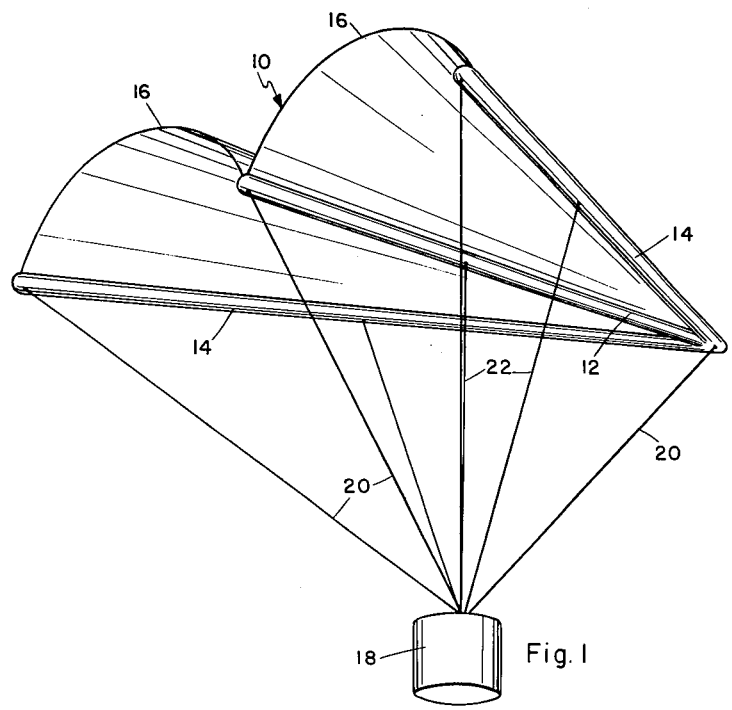
FIGURE 1 is a perspective view from below of the fully opened wing, with attached payload; to illustrate the basic structure.

The wing, generally indicated at 10, is of the Rogallo or parawing type, having a central longitudinal keel 12, leading edge members 14 extending rearwardly and outwardly from the forward end of the keel, and flexible wing panels 16 fixed to and between the keel and leading edge members. The keel 12 and leading edge members 14 may be inflatable, resilient, hinged, or otherwise constructed so that the wing can be folded into a small package. When opened, the keel and leading edge members are substantially rigid and provide longitudinal stiffness, but the wing panels 16 are free to bow upwardly between their edge supporting members and form aerodynamic lifting surfaces which are maintained in shape by the air loads. The principles and operation of this type of wing are well known and need not be elaborated in this disclosure. Similarly, the specific construction and materials involved will depend on the particular use and performance required and can range from simple plastic or plasticized fabrics to metal or glass fiber reinforced materials.

A payload 18 is attached to the wing 10 by a plurality of flexible suspension lines 20 secured to the longitudinal members. As illustrated, a line 20 is secured to the rear end of each leading edge member 14 and keel 12, a single line extends from the forward end of said keel, and intermediate lines 22 are attached to the mid points of the keel and leading edges. Additional suspension lines may be used, but the general configuration will be functionally equivalent in that the payload is supported from the entire wing.

WING FOLDING AND STOWAGE

Figure 3:
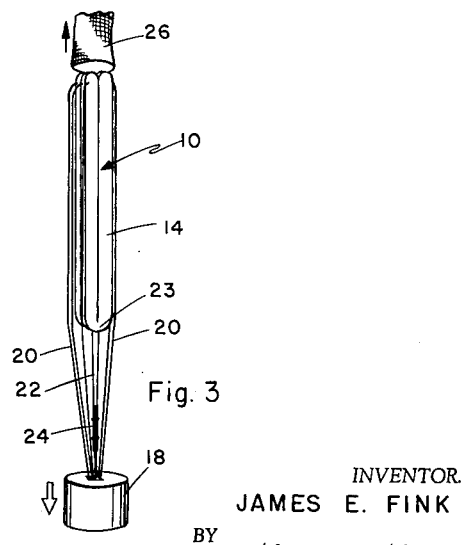
FIGURE 3 is a view showing the wing linearly extended but not opened.

The wing is collapsed with the panels 16 suitably folded and the keel 12 and leading edge members 14 in close parallel relation, the wing then being folded at the center with the forward and rear ends moved upwardly and outwardly and the folded end 23 disposed downwardly adjacent the payload. This arrangement places all of the suspension lines 20 on the outside of the folded wing, as in FIGURE 3. To avoid tangling, the intermediate lines 22, now attached at the fold of the wing, are reefed in any suitable manner, the reefed portions being indicated at 24. Various means for reefing and disreefing of suspension lines are known in parachute art and the specific method used will depend on the services available for actuating the disreefing.

The folded wing is preferably enclosed in an elongated sleeve 26 of flexible fabric or other material, the upper end of which is attached to a small pilot chute 28 or static line as used in parachute deployment. The wing, enclosed in its sleeve, can then be folded in any suitable manner, such as accordian folded, and attached to or stowed in the payload, which can be a cargo or instrument capsule, a passenger capsule, space vehicle, or the like. It should be noted that the sleeve 26 is not essential if the wing can be stowed in a suitable manner to facilitate ejection, but the sleeve does protect the wing and reduces the possibility of line entanglement during stowage.

WING DEPLOYMENT

Figure 2:
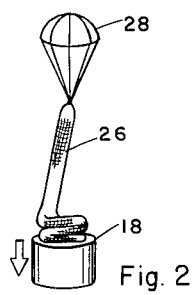
FIGURE 2 is a view of the folded wing beginning its initial extension.

At the time of deployment the payload will normally be falling in a generally downward direction. As soon as the pilot chute 28 is released the sleeve enclosed wing is pulled out to its full linear extension, the initial action being illustrated in FIGURE 2. Continued drag of the pilot chute 28 strips off the sleeve 26, leaving the extended but still folded wing exposed, as in FIGURE 3. Air drag will now start to open the wing and extend the panels 16, causing the forward and rear ends of the wing to separate outwardly. The reefed portions 24 are now disreefed, or released, as in FIGURE 4, allowing the intermediate lines 22 to extend as the central portion of the wing unfolds.

At all times the opening action of the front and rear portions is in the general direction of travel of the payload, as indicated by directional arrows. The suspension lines 20 are kept substantially tight and, being on the outside, are separated outwardly as the wing opens kept free from entanglement, while the disreefed portions of lines 22 are well clear of the other lines as the wing opens and can extend freely. This is distinct from the normal method of parachute packing, wherein all of the suspension lines are in a common bundle along their full length and can become tangled if unusual air flow conditions interfere with the opening.

In the fully open position, as in FIGURES 1 and 5, the wing 10 is an effective glide vehicle and will carry the payload in a forward direction at low sinking speed.

ALTERNATIVE FOLDING

For certain applications, as with very large wings, it may be necessary to utilize air flow to the maximum extent to assist opening of the wing. This can be accomplished by additional folds in the stowed wing, which opens in the manner illustrated in FIGURE 6. In this configuration the central portion of the wing 10 is given an upward fold 30 between two downward folds 32, the wing assuming a substantially W-shaped form during opening. The air flow caused by the descent of the payload and wing enters the central portion of the wing under the upward fold 30, which forms a pocket, and forces the center of the wing up to assist in opening. Other than the special fold the wing is packed in the manner described above, with all of the suspension lines on the outside of the folded wing to avoid entanglement.

The deployment technique is applicable to various uses, such as the recovery of space vehicles or capsules, dropping of cargo and supplies, personnel dropping and the like, the wing taking the place of a parachute and providing extended glide range with accurate control of landing location.

It is understood that minor variation from the form of the invention disclosed herein may be made without departure from the spirit and scope of the invention, and that the specification and drawings are to be considered as merely illustrative rather than limiting.

I claim:

1. A method of packing and deploying a foldable wing having foldable longitudinal edge supporting members, with flexible lifting panels between the members and flexible suspension lines secured at spaced positions along the members, comprising:
    arranging the edge supporting members in adjacent, substantially parallel relation with the lifting panels folded therebetween;
    folding the wing with a substantially centrally folded portion and bringing the opposite ends of the edge supporting members together with the suspension lines on the outside of the folded assembly;
    securing the suspension lines collectively to a payload to be air dropped and stowing the wing in folded position on the payload;
    and, when the payload is dropped, releasing the folded wing into the air stream, whereby the air pressure opens the wing with the opposite ends thereof opening outwardly and downwardly in the general direction of travel, the suspension lines being separated outwardly without entanglement.

2. A method of packing and deploying a foldable wing having foldable longitudinal edge supporting members, with flexible lifting panels between the members and flexible suspension lines secured at spaced positions along the members, comprising:
    arranging the edge supporting members in adjacent, substantially parallel relation with the lifting panels folded therebetween;
    folding the wing with a substantially centrally folded portion and bringing the opposite ends of the edge supporting members together with the suspension lines attached adjacent the ends thereof disposed on the outside of the folded assembly;
    reefing the suspension lines attached to the wing intermediate the ends of the supporting members;
    securing the suspension lines collectively to a payload to be air dropped and stowing the wing in folded position on the payload;
    then, when the payload is dropped, releasing the folded wing into the air stream, whereby the air pressure opens the wing with the opposite ends thereof opening outwardly and downwardly in the general direction of travel, the outside disposed suspension lines being separated outwardly without entanglement;
    and disreefing the reefed suspension lines to allow the folded portion of the wing to open fully.

3. A method of packing and deploying a foldable wing having foldable longitudinal edge supporting members, with flexible lifting panels between the members and flexible suspension lines secured at spaced positions along the members, comprising:
    arranging the edge supporting members in adjacent, substantially parallel relation with the lifting panels folded therebetween;
    folding the wing with a substantially centrally folded portion and bring the opposite ends of the edge supporting members together with the suspension lines attached adjacent the ends thereof disposed on the outside of the folded assembly;
    reefing the suspension lines attached to the wing intermediate the ends of the supporting members;
    enclosing the folded wing and suspension lines in an elongated sleeve;
    securing the suspension lines collectively to a payload to be air dropped and stowing the wing in folded position on the payload;
    then when the payload is dropped, releasing the wing into the airstream;
    stripping off the sleeve to expose the folded wing, whereby air pressure opens the wing with the opposite ends thereof opening outwardly and downwardly in the general direction of travel, the outside disposed suspension lines being separated outwardly without entanglement;
    and disreefing the reefed suspension lines to allow the folded portion of the wing to open fully.

References Cited by the Examiner

UNITED STATES PATENTS

| 782,744 | 2/05 | Funk | 244—149 |
| 1,774,811 | 9/30 | Nelson | 244—149 |
| 2,610,815 | 9/52 | Smith | 244—141 X |
| 3,079,113 | 2/63 | Meyer | 244—140 |
| 3,141,640 | 7/64 | Sutliff et al. | 244—138 |

FOREIGN PATENTS

| 458,187 | 8/13 | France. |
| 533,740 | 12/21 | France. |
| 1,166,414 | 6/58 | France. |

OTHER REFERENCES

"Flexible Wing Research and Development," Rogallo Paper presented at the Symposium on Retardation and Recovery, Dayton, Ohio, Nov. 13–14, 1962–244–F.W. Dig.

MILTON BUCHLER, *Primary Examiner.*

FERGUS S. MIDDLETON, *Examiner.*